United States Patent
Dhar et al.

(10) Patent No.: US 8,036,260 B2
(45) Date of Patent: Oct. 11, 2011

(54) SYSTEM AND METHOD FOR EQUALIZING AN INCOMING SIGNAL

(75) Inventors: Kaushal K. Dhar, Stafford, VA (US); Timothy R. Miller, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1076 days.

(21) Appl. No.: 11/896,184

(22) Filed: Aug. 30, 2007

(65) Prior Publication Data

US 2009/0060022 A1  Mar. 5, 2009

(51) Int. Cl.
*H03H 7/30* (2006.01)
*H03K 5/159* (2006.01)

(52) U.S. Cl. .................... 375/233; 375/229; 375/232

(58) Field of Classification Search .................. 375/229, 375/233, 350, 231, 232; 708/300, 322, 323; 333/18, 28 R
See application file for complete search history.

(56) References Cited

U.S. PATENT DOCUMENTS

| | | | |
|---|---|---|---|
| 4,649,505 A | 3/1987 | Zinser, Jr. et al. | |
| 5,850,162 A | 12/1998 | Danielsons | |
| 6,118,339 A | 9/2000 | Gentzler et al. | |
| 6,140,874 A | 10/2000 | French et al. | |
| 6,144,255 A | 11/2000 | Patel et al. | |
| 6,147,555 A | 11/2000 | Posner et al. | |
| 2003/0138038 A1* | 7/2003 | Greiss et al. | 375/232 |
| 2006/0104342 A1 | 5/2006 | Shanbhag et al. | |
| 2006/0146925 A1 | 7/2006 | Birru | |
| 2006/0164270 A1* | 7/2006 | Miller et al. | 341/143 |

OTHER PUBLICATIONS

International Search Report and Written Opinion correlating to PCT/US2008/069510, dated Oct. 30, 2008.

* cited by examiner

*Primary Examiner* — Betsy Deppe

(57) ABSTRACT

An equalizer is provided, including: a feedback combiner to combine an input signal and a feedback signal to produce a first signal; a delay line to delay the first signal to produce a second signal; a feed-forward combiner to combine the second signal and a feed-forward signal to produce an output signal; an interim decision circuit to extract a sign bit from the first signal; N feedback scaling elements to generate N scaled feedback signals; M feed-forward scaling elements to generate M scaled feed forward signals; a feedback circuit to pass the N scaled feedback signals through feedback delay elements and feedback summing elements to generate the feedback signal in response to the sign bit; and a feed forward circuit to pass the M scaled feed forward signals through feed-forward delay elements and feed-forward summing elements to generate the feed-forward signal in response to the sign bit.

16 Claims, 6 Drawing Sheets

US 8,036,260 B2

SYSTEM AND METHOD FOR EQUALIZING AN INCOMING SIGNAL

FIELD OF THE INVENTION

This invention relates in general to communication systems and more specifically to an apparatus and methods for implementing decision feed-forward/feedback equalizers in receivers in such systems.

BACKGROUND OF THE INVENTION

Wireless communication devices or units such as receivers and transceivers supporting high and ultra high bandwidth and data rates in corresponding systems are being developed. As these systems have evolved higher frequency channels with larger bandwidths and more sophisticated encoding and modulation schemes are being employed. For example, IEEE 802.15 working group is developing standards for short range communications that specify channels from 3.1 GHz to 5.15 GHz and from 5.825 GHz to 10.6 GHz and data rates as high as 1.35 Gbps (billion bits per second). These systems with wideband or ultra wideband channels that are often referred to as complex channels, present various problems for practitioners. One problem is inter-symbol interference (ISI) that is normally dominated by multipath effects, e.g. the impact of receiving multiple signals or rays as a result of various combinations of reflections of a transmitted signal before it arrives at the receiver location.

It is known to use equalizers and corresponding methods to improve or reduce the degree of ISI. Generally a training period is used where a known signal is transmitted. When the receiver recovers the known signal various techniques can be used to compensate or restore the recovered signal to a reasonable approximation of the known signal. The resulting compensation or equalization information or parameters can then be used to compensate subsequently and unknown signals that are received. While various techniques exist for performing equalization they suffer from various problems, such as excessive computational complexity or latency or failure to address the relevant vagaries of a complex channel. These shortcomings can be especially troublesome in cost and battery life constrained receivers with limited processing or computational resources.

One way to provide such equalization is by a combination of feedback and feed-forward signals. In such an equalizer system the processing speed of a feed-forward path is generally not critical. Although it is desirable to perform feed-forward within one symbol period, it is possible to accommodate a longer feed-forward processing time. However, feedback structures are typically much more sensitive to processing time, and must be accomplished within a single symbol period.

Thus a need exists for feedback/feed-forward equalizer designs that can complete the feed-forward and feedback processes within single symbol period without requiring too much circuit complexity.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Feed-Forward/Feedback Circuit

Figure 1:
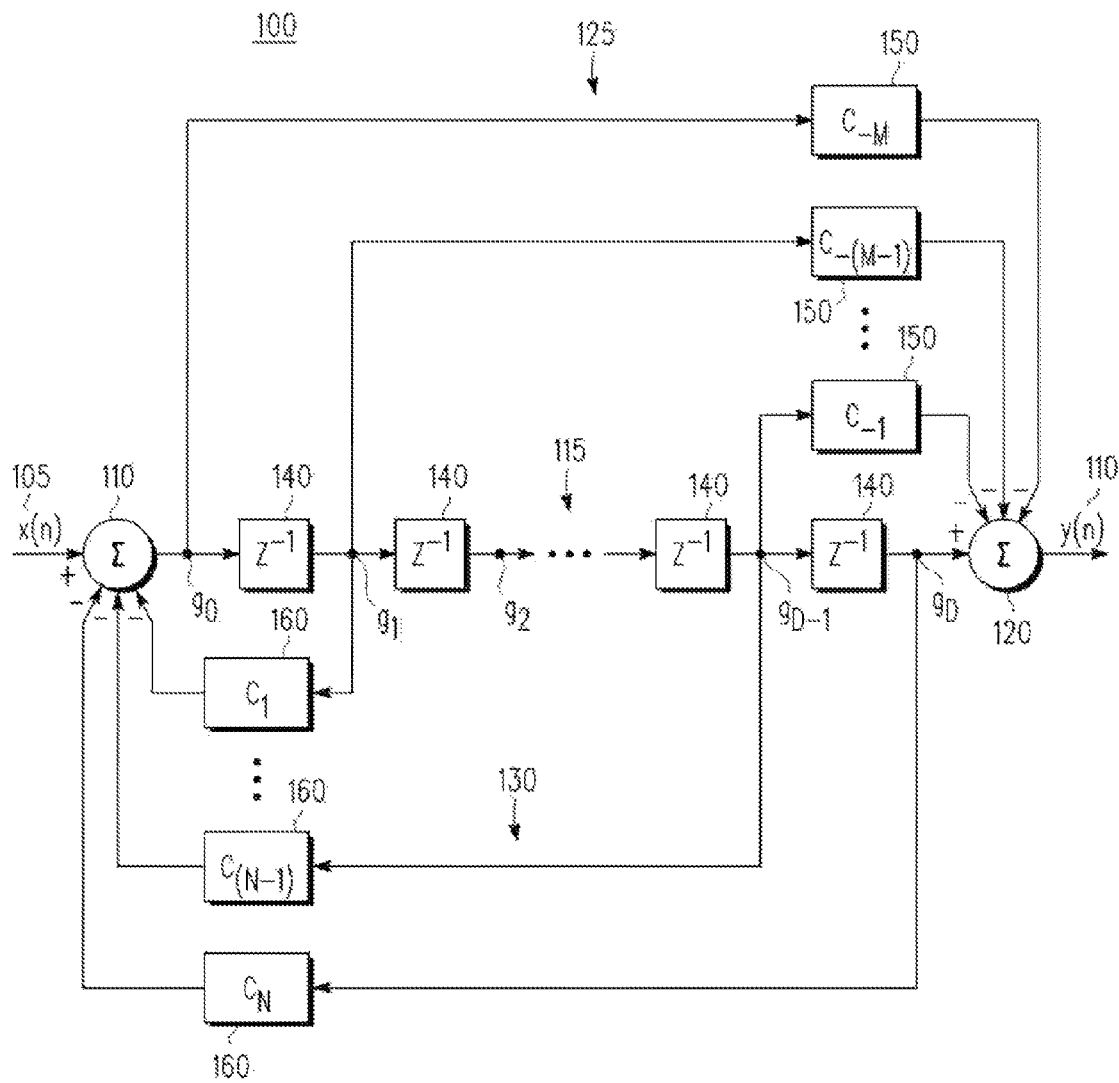
FIG. 1 is a block diagram of a feed-forward and feedback equalizer according to a disclosed embodiment.

FIG. 1 is a block diagram of a feed-forward and feedback equalizer (DFFE) according to a disclosed embodiment. The equalizer 100 of FIG. 1 includes an input summer 110, a delay line 115, and output summer 120, a feed-forward path 125, and a feedback path 130. The delay line includes D delay elements 140; the feed-forward path 125 includes M feed-forward scaling units 150; and the feedback path 130 includes N feedback scaling units 160.

The input summer 110 subtracts N feedback signals from the input signal x(n) 105 to generate an initial intermediate signal $g_0$.

The delay line 115 receives the initial intermediate feedback signal $g_0$ and delays it through each of the delay circuits 140 to form the first through $D^{th}$ intermediate signals $g_1, \ldots, g_D$. Each of the delay circuits delays an intermediate signal $g_i$ by the same amount to form an intermediate signal $g_{i+1}$.

The output summer 120 subtracts M feed-forward signals from the $D^{th}$ intermediate signal $g_D$ to generate the output signal y(n) 110.

The M feed-forward scaling units 150 in the feed-forward path 125 each scale a signal from a different tap along the delay line 115 by a corresponding scaling value, and provides them to the output summer 120.

The N feedback scaling units 160 in the feedback path 130 each scale a signal from a different tap along the delay line 115 by a corresponding scaling value, and provide them to the input summer 110.

The FIG. 1 architecture for this implementation of a DFFE can be described by the following equations:

$$g_0 = x - \sum_{i=1}^{N} \text{sgn}(g_i)c_i \quad (1)$$

$$y = g_D - \sum_{i=0}^{D-1} \text{sgn}(g_i)c_{-D+i} \quad (2)$$

where x refers to the input signal x(n) 105, y refers to the output signal y(n) 110; $g_0, \ldots, g_N$ are the signals at the corresponding nodes along the delay line 115, with D=max (M, N)+1; $\text{sgn}(g_i)$ refers to the polarity of $g_i$, e.g. less than or greater than 0; $c_i$ refers to a feedback scaling factor and $c_{-D+i}$ refers to a feed-forward scaling factor, which together correspond to an estimate of channel parameters. Each coefficient function or box 150, 160 performs a hard bit decision on the soft data in the delay line and scales it with the appropriate channel coefficient. In this illustration, the number of feedback and feed-forward coefficients is equal. However, alternative embodiments may be different in number.

Figure 2:
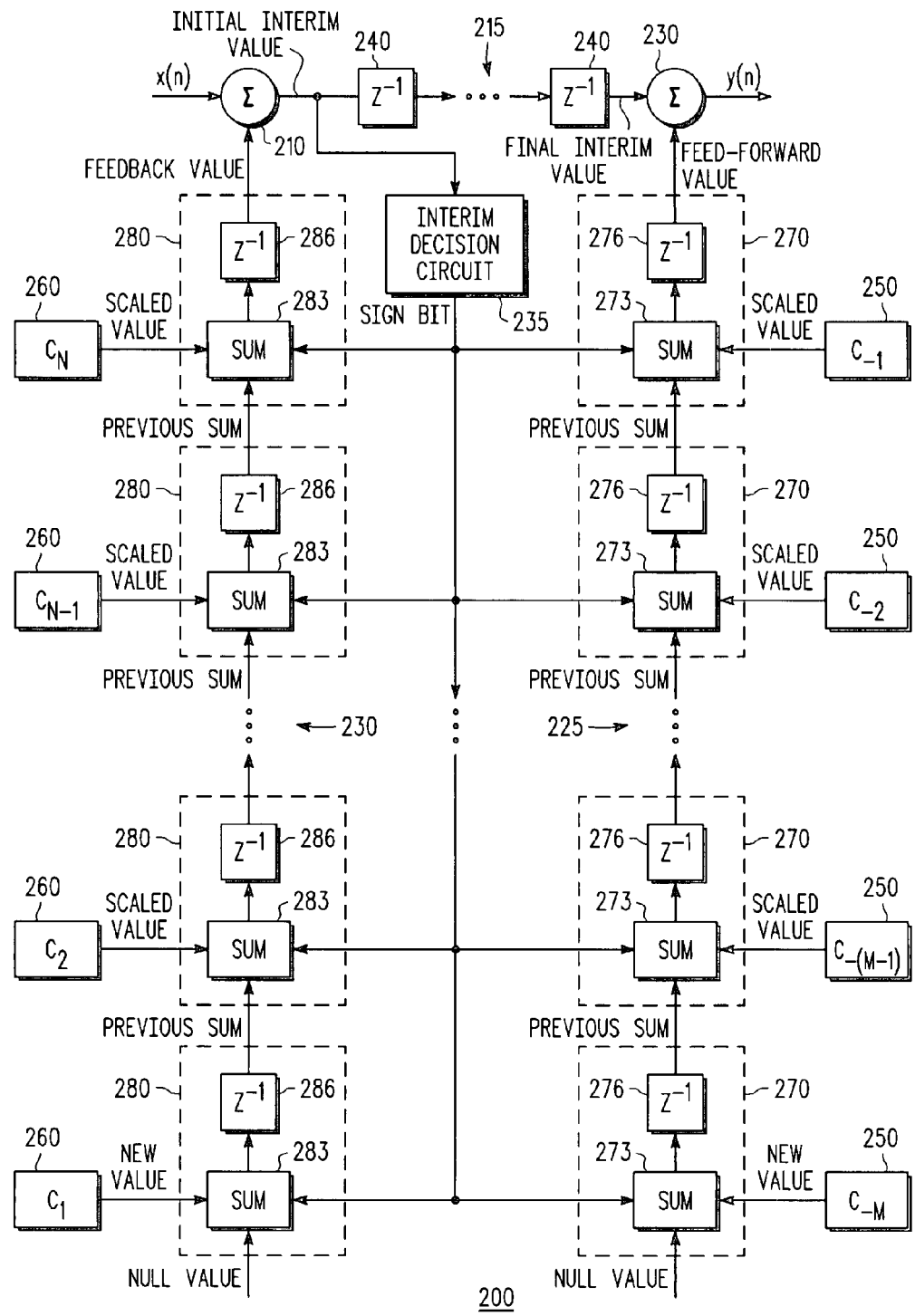
FIG. 2 a circuit diagram of the feed-forward and feedback equalizer of FIG. 1, according to a disclosed embodiment.

FIG. 2 a circuit diagram of the feed-forward and feedback equalizer of FIG. 1, according to a disclosed embodiment.

As shown in FIG. 2, the equalizer 200 includes an input summer 210, a delay line 215, and output summer 220, a feed-forward path 225, a feedback path 230, and an interim decision circuit 235. The delay line 215 includes D delay elements 240. The feed-forward path 225 includes M feed-forward scaling units 250 and M feed-forward elements 270. Each of the M feed-forward elements 270 includes a feed-forward add/subtract circuit 273, and a delay circuit 276. The feedback path 230 includes N feedback scaling units 260 and N feedback elements 280. Each of the N feedback elements 280 includes a feedback add/subtract circuit 283, and a delay circuit 286.

The input summer 210 subtracts a feedback value from the input signal x(n) to generate an initial interim value.

The delay line 215 receives the initial interim value and delays it through the plurality of delay circuits 240 to form a final interim value. The number of delay circuits 240 (D) in the delay line 215 is at least one greater than the larger of the number of feed-forward elements 270 (M) or feedback elements 280 (N).

The output summer 220 subtracts a feed-forward value from the final interim value to generate the output signal y(n).

The interim decision circuit 235 examines the initial interim value and generates a sign bit indicative of the sign (i.e., polarity) of the initial interim value. In the disclosed embodiment the sign bit is positive (+1) if the sign of the initial interim value is positive, and is negative (−1) if the sign of the initial interim value is negative. However, this could be reversed in alternate embodiments, and operation of the feed-forward path 225 and the feedback path 230 adjusted accordingly.

The M feed-forward scaling units 250 in the feed-forward path 225 each provide a feed-forward scaled value determined by a training block (See, FIG. 5) to correspond to a tap point along the delay line 215.

The N feedback scaling units 260 in the feedback path 230 each provide a feedback scaled value determined by a training block (See, FIG. 5) to correspond to a tap point along the delay line 215.

The M feed-forward elements 270 each perform a summation operation and a delay operation based on the value of the current sign bit to generate a next previous sum in the feed-forward path 225. In the disclosed embodiment, each feed-forward element 270 adds the corresponding scaled value to a previous sum from a previous feed-forward element 270 if the sign bit is positive, and subtracts the corresponding scaled value from the previous sum if the sign bit is negative. Alternate embodiments could alter this if the sign of the scaled values were reversed.

The first of the feed-forward elements 270 receives a null value instead of a previous sum, since there is no previous feed-forward element 270 to provide a previous sum. The last of the feed-forward elements 270 provides the feed-forward value since there is no later feed-forward element 270 to receive a previous sum.

The N feedback elements 280 each perform a summation operation and a delay operation based on the value of the current sign bit to generate a next previous sum in the feedback path 230. In the disclosed embodiment, each feedback element 280 adds the corresponding scaled value to a previous sum from a previous feedback element 280 if the sign bit is positive, and subtracts the corresponding scaled value from the previous sum if the sign bit is negative. Alternate embodiments could alter this if the sign of the scaled values were reversed.

The first of the feedback elements 280 receives a null value instead of a previous sum, since there is no previous feedback element 280 to provide a previous sum. The last of the feedback elements 280 provides the feedback value since there is no later feedback element 280 to receive a previous sum.

By pipelining all of the summations in its equalization operation, the equalizer 200 of FIG. 2 only employs two-element summers. At any given time, a running summation is kept along each of the feed-forward path 225 and the feedback path 230. As a result, the feed-forward value corresponds to a summation of a plurality of feed-forward signals taken from a plurality of taps along the delay line 215. However, the output summer 220 need only add the single feed-forward value to the final interim value to generate the output signal y(n). Similarly, the feedback value corresponds to a summation of a plurality of feedback signals taken from a plurality of taps along the delay line 215. However, the input summer 210 need only add the single feedback value to the input signal x(n) to generate the initial interim value. And since a two-element summer is typically faster than a multiple-element summer, this can significantly increase the speed of the equalization process.

The delay circuits 240, 276, and 286 are all of the same value, so that the feed-forward path 225 and the feedback path 230 can properly simulate taps along the delay line 215.

Although FIG. 2 shows an embodiment in which the number of feed-forward elements (M) in the feed-forward path 225 and the number of feedback elements (N) in the feedback path 230 are both equal to the number of delays (D) in the delay line 215, alternate embodiments could use smaller values of M and N, and they need not be identical. However, if M or N were reduced in number, any eliminated feed-forward elements 270 or feedback elements 280 that conceptually corresponds to a delay element 240 in the delay line 215 should be replaced by a single delay element 276, 286. This is so that the final feedback and feed-forward values generated by the feedback path 230 and the feed-forward path 225, respectively, would have the proper amount of delay to correspond to the proper delay line taps that are being simulated.

Figure 3:
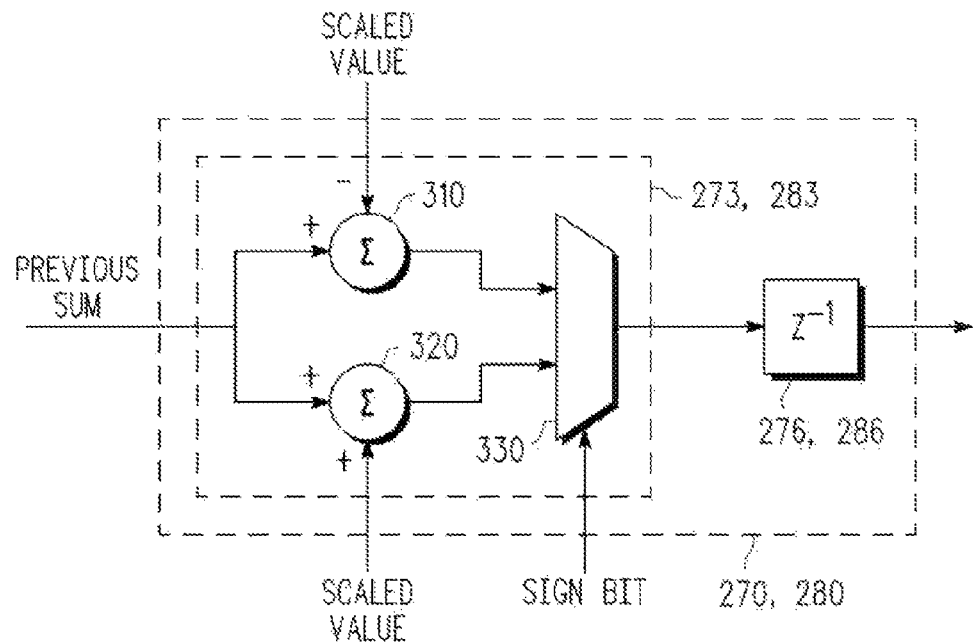
FIG. 3 is a circuit of a feedback/feed-forward element of FIG. 2, according to one disclosed embodiment.

FIG. 3 is a circuit of a feedback/feed-forward element of FIG. 2, according to one disclosed embodiment. As shown in FIG. 3, the feedback/feed-forward element 270, 280 includes multiplexer 330, an add/subtract circuit 273, 283 and a delay element 276, 286. The add/subtract circuit 273, 283 includes summers 310 and 320, multiplexer 330.

The summer 310 receives a previous sum and subtracts the scaled value from it to generate a subtracted value; and the summer 320 receives the previous sum and adds the scaled value to it to generate an added value.

The multiplexer 330 then chooses either the subtracted value or the added value based on the sign bit and outputs this as a selected value.

The delay element 276, 286 then delays the selected value to generate a current sum.

By generating the subtracted value and the added value immediately, the selected value can be generated as soon as the sign bit becomes available; there is no need to perform any lengthy multiplication operation on the sign bit. The subtracted value corresponds to a case in which the sign bit is −1, and the added value corresponds to a case in which the sign bit is +1. Thus, both possible summations are pre-calculated and the multiplexer 330 need only select one. This can reduce the amount of time required for the feedback/feed-forward element 270, 280 to perform its operation.

Figure 4:
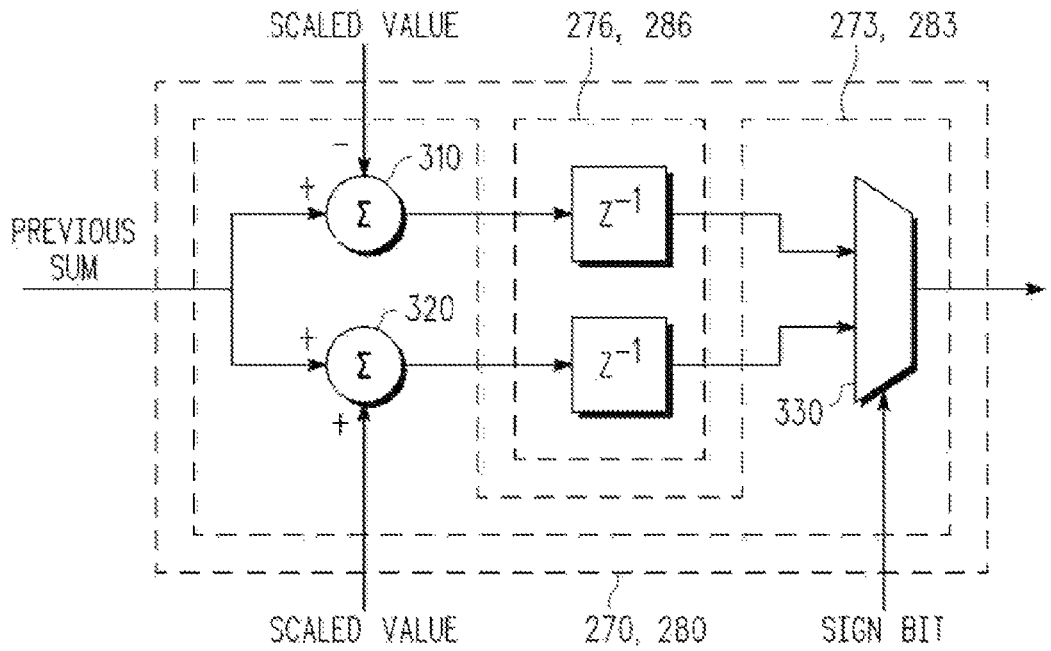
FIG. 4 is a circuit of a feedback/feed-forward element of FIG. 2, according to another disclosed embodiment.

FIG. 4 is a circuit of a feedback/feed-forward element of FIG. 2, according to another disclosed embodiment. As shown in FIG. 4, the feedback/feed-forward element 260, 270 is similar to the feedback/feed-forward element 270, 280 shown in FIG. 3, except that the delay element 276, 286 is placed between the multiplexer 330 and the summers 310 and 320.

This embodiment requires that the delay element 276, 286 contain two individual delay elements, one for the added value and one for the subtracted value.

In general, an equalizer is provided, comprising: a feedback combiner configured to combine an input signal and a single feedback signal to produce a first interim signal; a delay line configured to delay the first interim signal to produce a second interim signal; a feed-forward combiner configured to combine the second interim signal and a single feed-forward signal to produce an output signal; an interim decision circuit configured to extract a value of a sign bit from the first interim signal; first through $N^{th}$ feedback scaling elements each configured to multiply the value of the sign bit by a corresponding one of first through $N^{th}$ coefficients, respectively, to generate first through $N^{th}$ scaled feedback signals; first through $M^{th}$ feed-forward scaling elements each configured to multiply the value of the sign bit by a corresponding one of first through $M^{th}$ coefficients, respectively, to generate first through $M^{th}$ scaled feed-forward signals; a feedback circuit configured to pass the first through $N^{th}$ scaled feedback signals through a plurality of feedback delay elements and a plurality of feedback two-element summing elements to generate the feedback signal; and a feed-forward circuit configured to pass the first through $M^{th}$ scaled feed-forward signals through a plurality of feed-forward delay elements and a plurality of feed-forward two-element summing elements to generate the feed-forward signal, wherein M is an integer greater than 1, and N is an integer greater than 1.

In this equalizer, each of the first through $N^{th}$ feedback scaling elements may comprise: a first feedback pre-scaling element configured to provide a first feedback pre-scaled value equivalent to a corresponding feedback coefficient multiplied by a first possible value of the sign bit; a second feedback pre-scaling element configured to provide a second feedback pre-scaled value equivalent to the corresponding feedback coefficient multiplied by a second possible value of the sign bit; and a feedback selection element configured to receive both the first feedback pre-scaled value and the second feedback pre-scaled value, and to output one of the first feedback pre-scaled value and the second feedback pre-scaled value as a corresponding scaled feedback signal in response to the value of the sign bit.

In this equalizer, each of the first through $M^{th}$ feed-forward scaling elements may comprise: a first feed-forward pre-scaling element configured to provide a first feed-forward pre-scaled value equivalent to a corresponding feed-forward coefficient multiplied by a first possible value of the sign bit; a second feed-forward pre-scaling element configured to provide a second feed-forward pre-scaled value equivalent to the corresponding feedback coefficient multiplied by a second possible value of the sign bit; and a feed-forward selection element configured to receive both the first feed-forward pre-scaled value and the second feed-forward pre-scaled value, and to output one of the first feed-forward pre-scaled value and the second feed-forward pre-scaled value as a corresponding scaled feed-forward signal in response to the value of sign bit.

In this equalizer, the feedback circuit may comprise: first through $N^{th}$ feedback summing and delaying elements, each configured to receive a corresponding one of the first through $N^{th}$ feedback scaled values and a corresponding one of first through $N^{th}$ feedback input values, and to generate first through $N^{th}$ feedback summed signals, respectively, wherein the first feedback input value is a null value, wherein each of the second through $N^{th}$ feedback input values is equal to a previous one of the first through $N^{th}$ feedback summed signals, and wherein the $N^{th}$ feedback summed signal is provided as the single feedback signal.

In this equalizer, the feed-forward circuit may comprise: first through $M^{th}$ feed-forward summing and delaying elements, each configured to receive a corresponding one of the first through $M^{th}$ feed-forward scaled values and a corresponding one of first through $M^{th}$ feed-forward input values, and to generate first through $M^{th}$ feed-forward summed signals, respectively, wherein the first feed-forward input value is a null value, wherein each of the second through $M^{th}$ feed-forward input values is equal to a previous one of the first through $M^{th}$ feedback summed signals, and wherein the $M^{th}$ feed-forward summed signal is provided as the single feed-forward signal.

The sign bit may be a most significant bit of the interim signal. The equalizer may be implemented in an integrated circuit.

An equalizer is also provided, comprising: a feedback combiner configured to combine an input signal and a single feedback signal to produce a first interim signal; a delay line configured to delay the first interim signal to produce a second interim signal; a feed-forward combiner configured to combine the second interim signal and a single feed-forward signal to produce an output signal; an interim decision circuit configured to extract a sign bit from the first interim signal;

first through $N^{th}$ feedback scaling elements each configured to generate first through $N^{th}$ positive scaled feedback signals; first through $M^{th}$ feed-forward scaling elements each configured to generate first through $M^{th}$ positive scaled feed-forward signals; a feedback circuit configured to pass the first through $N^{th}$ positive scaled feedback signals through a plurality of feedback delay elements and a plurality of feedback two-element summing elements to generate the feedback signal in response to the sign bit; and a feed-forward circuit configured to pass the first through $M^{th}$ scaled feed-forward signals through a plurality of feed-forward delay elements and a plurality of feed-forward two-element summing elements to generate the feed-forward signal in response to the sign bit, wherein M is an integer greater than 1, and N is an integer greater than 1.

In this equalizer, the feedback circuit may comprise: first through $(N-1)^{th}$ positive feedback summing elements, each configured to add a corresponding one of the first through $(N-1)^{th}$ positive feedback scaled signals to a corresponding one of first through $(N-1)^{th}$ feedback input signals to generate a corresponding one of first through $(N-1)^{th}$ added feedback summed signals; first through $(N-1)^{th}$ negative feedback summing elements, each configured to subtract a corresponding one of the first through $(N-1)^{th}$ positive feedback scaled signals to a corresponding one of the first through $(N-1)^{th}$ feedback input signals to generate a corresponding one of first through $(N-1)^{th}$ subtracted feedback summed signals; first through $(N-1)^{th}$ selection elements each configured to select a corresponding one of the first through $(N-1)^{th}$ added feedback summed signals and the first through $N^{th}$ subtracted feedback summed signals as a corresponding one of first through $N^{th}$ selected feedback summed signals; an $N^{th}$ selection element configured to select one of the $N^{th}$ positive feedback scaled signal and an inverse of the $N^{th}$ positive feedback scaled signal as an $N^{th}$ selected feedback summed signal; first through $N^{th}$ delay elements configured to delay the first through $N^{th}$ selected feedback summed signals, respectively, to generate first through $N^{th}$ feedback output signals, wherein each of the first through $(N-1)^{th}$ feedback input values is equal to a corresponding previous one of the second through $N^{th}$ feedback output signals, and wherein the first feedback output signal is provided as the single feedback signal.

In the equalizer, the feed-forward circuit may comprise: first through $(M-1)^{th}$ positive feed-forward summing elements, each configured to add a corresponding one of the first through $(M-1)^{th}$ positive feed-forward scaled signals to a corresponding one of first through $(M-1)^{th}$ feed-forward input signals to generate a corresponding one of first through $(M-1)^{th}$ added feed-forward summed signals; first through $(M-1)^{th}$ negative feed-forward summing elements, each configured to subtract a corresponding one of the first through $(M-1)^{th}$ positive feed-forward scaled signals to a corresponding one of the first through $(M-1)^{th}$ feed-forward input signals to generate a corresponding one of first through $(M-1)^{th}$ subtracted feed-forward summed signals; first through $(M-1)^{th}$ selection elements each configured to select a corresponding one of the first through $(M-1)^{th}$ added feed-forward summed signals and the first through $M^{th}$ subtracted feed-forward summed signals as a corresponding one of first through $M^{th}$ selected feed-forward summed signals; an $M^{th}$ selection element configured to select one of the $M^{th}$ positive feed-forward scaled signal and an inverse of the $M^{th}$ positive feed-forward scaled signal as an $M^{th}$ selected feed-forward summed signal; first through $M^{th}$ delay elements configured to delay the first through $M^{th}$ selected feed-forward summed signals, respectively, to generate first through $M^{th}$ feed-forward output signals, wherein each of the first through $(M-1)^{th}$ feed-forward input values is equal to a corresponding previous one of the second through $M^{th}$ feed-forward output signals, and wherein the first feed-forward output signal is provided as the single feed-forward signal.

Training and Equalization

Figure 5:
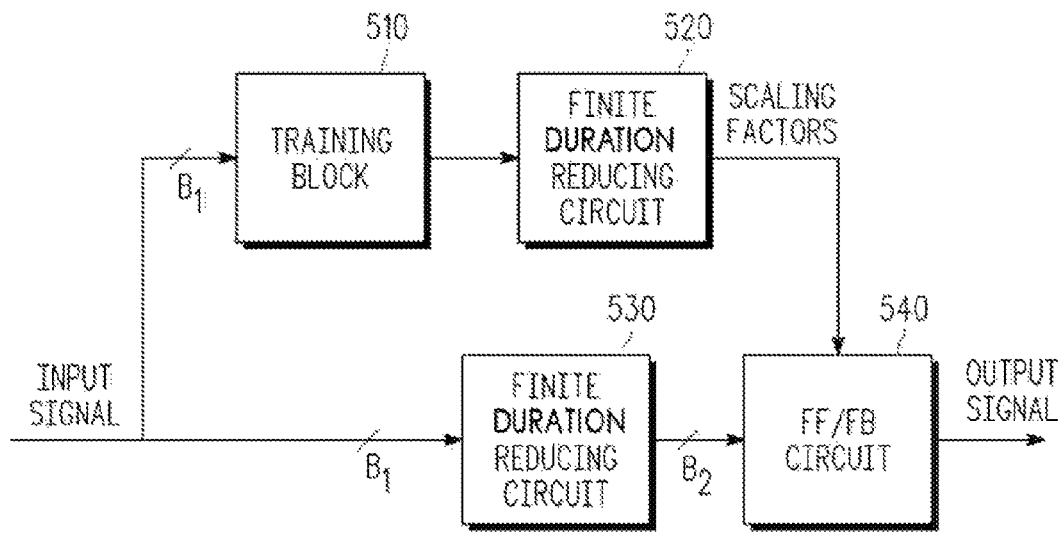
FIG. 5 is a block diagram of a receiving circuit according to a disclosed embodiment.

FIG. 5 is a block diagram of a receiving circuit according to a disclosed embodiment. As shown in FIG. 5, the receiving circuit 500 includes a training block 510, a finite duration reducing circuit 520, a finite duration reducing circuit 530, and a feed-forward/feedback (FF/FB) circuit 540.

The training block 510 receives an input signal of length $B_1$, and uses it during a training operation to determine the proper scaling factors required for the FF/FB circuit as an estimate of the channel parameters. One skilled in the art would understand how this training process would be performed.

The finite duration reducing circuit 520 and the finite duration reducing circuit 530 each reduce the incoming signal and the resulting scaling factors from $B_1$ bits to $B_2$ bits (where $B_2 < B_1$). This allows the receiving circuit 500 to use all of the bits ($B_1$) for training, but to drop to a smaller number of bits ($B_2$) during equalization to speed up the equalization process.

The feed-forward/feedback (FF/FB) circuit 540 uses the scaling factors provided from the training block 510 and the reduced input signal provided from the finite duration reducing circuit 530 to perform an equalization process, as described above and below.

Figure 6:
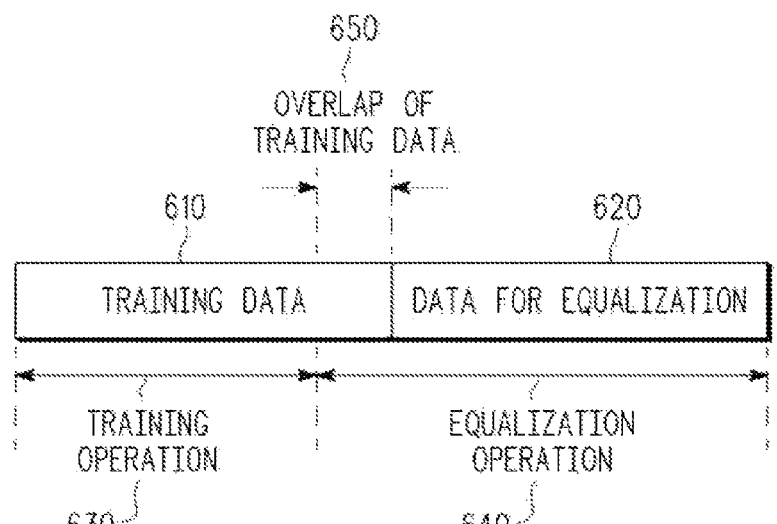
FIG. 6 is a block diagram showing the timing of data transmission for training and equalization operations according to a disclosed embodiment.

FIG. 6 is a block diagram showing the timing of data transmission for training and equalization operations according to a disclosed embodiment. As shown in FIG. 6, an incoming signal 600 includes training data 610 and data for equalization 620.

The training data 610 is sent during a training operation 630, and the data for equalization 620 is sent during an equalization operation 640. However, there is an overlap period 650 in which the equalization operation has begun, but the input signal still contains training data.

This overlap period allows the system to fill up the pipeline in the FF/FB circuit 540 with known data values that can be chosen to reduce or eliminate undesirable inter-symbol interference (ISI) in the early moments of the equalization process. Absent filling the FF/FB circuit 540 with a set of 'primed' data, undesirable ISI caused by random input data can influence the equalization process for a number of symbols equal to the length of the pipeline in the FF/FB circuit 540.

Method of Equalization

Figure 7:
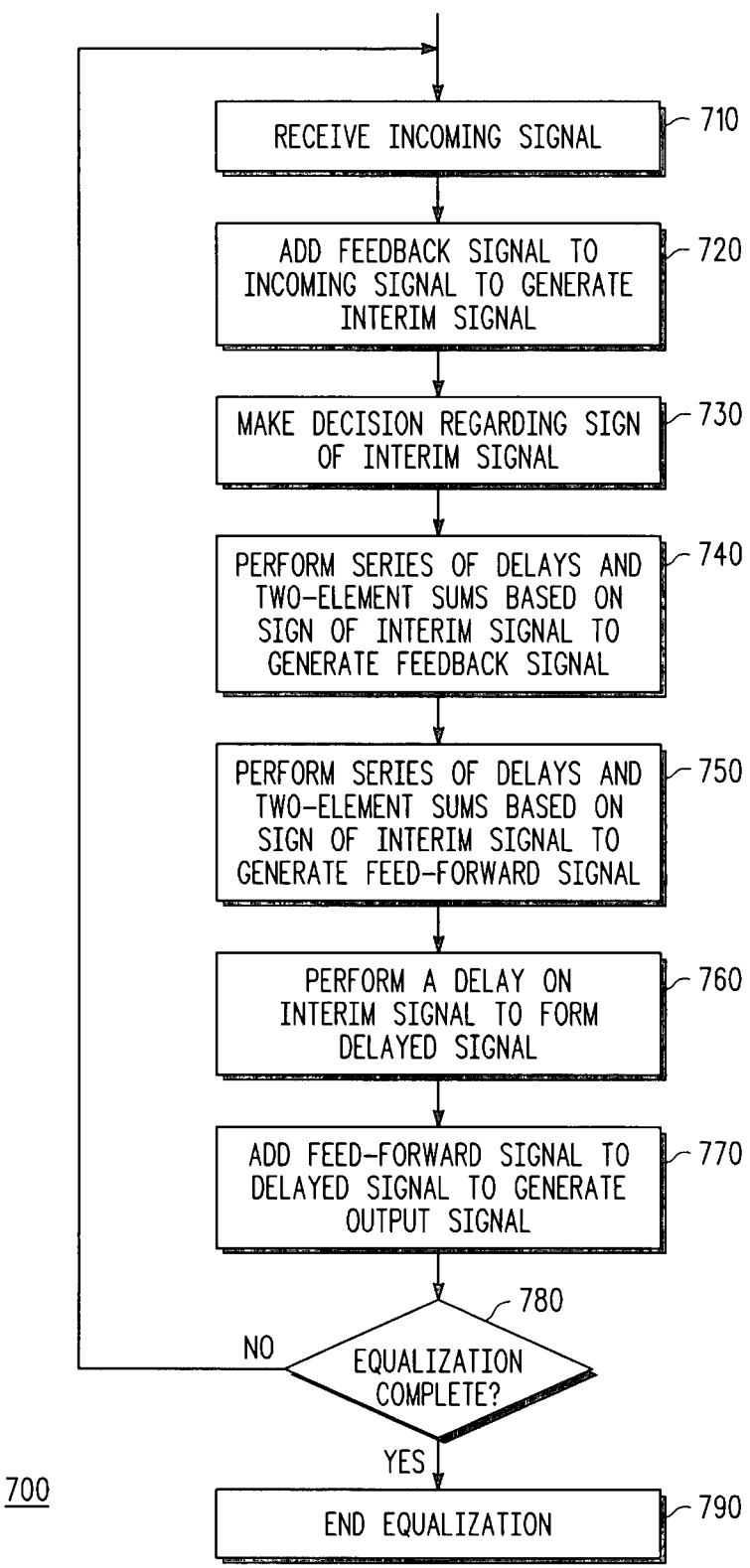
FIG. 7 is flowchart showing an equalization operation according to one disclosed embodiment.

FIG. 7 is flowchart showing an equalization operation according to one disclosed embodiment. As shown in FIG. 7, the process begins when the equalizer receives an incoming signal (710).

The equalizer adds a feedback signal to the incoming signal to generate an interim signal (720), and then makes a decision regarding the sign if of the interim signal (730).

Based on the sign of the interim signal, the equalizer performs a series of two-element sums to generate the feedback signal (740), and performs a series of two-element sums to generate the feed-forward signal (750).

The equalizer then performs a series of delay operations on the interim signal to form a delayed signal (760), and adds the feed-forward signal to the delayed signal to generate the output signal (770).

The equalizer then determines whether the equalization is complete (780). If yes, the equalization process ends (790); if no, it returns to receive a new incoming signal (710), and repeats the above operations.

Although operations 720 and 770 refer to "adding" the feedback and feed-forward signals, respectively, one skilled in the art would understand that this may also be a subtraction operation in some embodiments, depending upon exactly how the feedback and feed-forward signals are generated. In addition, although operations 740, 750, and 760 are described as separate operations, they can be performed in parallel.

Furthermore, although FIG. 7 shows a feedback delay and summing (740) and a feed-forward delay and summing (750) being performed during each iteration, some of these processes may be replaced with simple delays to account for the fact that there may be fewer feedback or feed-forward taps (i.e., feedback or feed-forward calculations) than there are delays in the equalizing operation.

Figure 8:
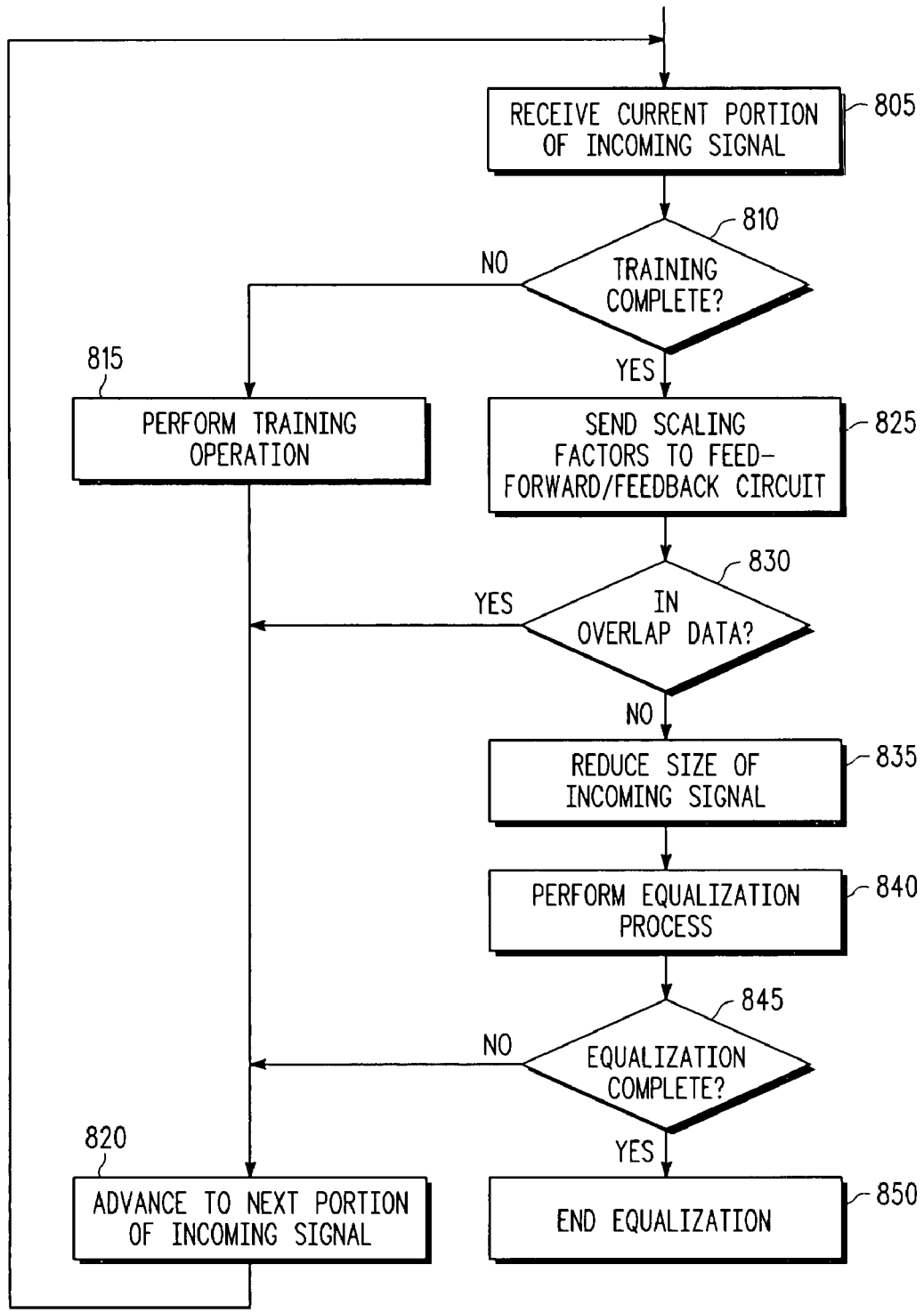
FIG. 8 is a flow chart of a combined training and equalization operation according to another disclosed embodiment.

FIG. 8 is a flow chart of a combined training and equalization operation according to another disclosed embodiment.

As shown in FIG. 8, the process begins when an equalizer receives a current portion of an incoming signal (805), and determines if training is complete (810). In one embodiment, this can be accomplished by monitoring the time since the equalizer began receiving the current signal, and determining whether a training period has ended. One goal of this training operation is to calculate scaling factors for feed-forward/feedback circuit.

If the training is not complete, the equalizer performs a training operation (815) and then advances to the next portion of the incoming signal (820) and receives that portion of the incoming signal (805).

If the training is complete, the equalizer sends the scaling factors to the feed-forward/feedback circuit (825).

In the case where an overlap of training data is provided at the interface between the training period and an equalization period, the equalizer determines whether it is in that overlap period, i.e., whether the equalizer is currently receiving overlap data (830).

If the equalizer is receiving overlap data, it simply advances to the next portion of the incoming signal (820) and receives that portion of the incoming signal (805).

If the equalizer is out of the overlap period, however, it reduces the size of the incoming signal (835) and performs an equalization process (840). In one embodiment, this equalization process can correspond to operations 720-770 in FIG. 7.

After performing the equalization process (840), the equalizer then determines whether equalization is complete (845). If the equalization is complete, the equalization process ends (850); and if the equalization is not complete, the equalization process advances to the next portion of the incoming signal (820) and receives that portion of the incoming signal (805).

In general, a method of performing signal equalization is provided, comprising: receiving an incoming signal; adding a feedback signal to the incoming signal to generate an interim signal; determining the sign of the interim signal; generating a plurality of selected feedback pre-scaled values based on the sign of the interim signal; passing the plurality of selected feedback pre-scaled values through a plurality of feedback delay elements and a plurality of feedback two-element summing elements to generate the feedback signal; delaying the interim signal to form a delayed signal; and adding the feed-forward signal to the delayed signal to generate an output signal.

The method may further comprise: determining a plurality of first feedback pre-scaled values, each being equivalent to a corresponding one of a plurality of feedback coefficients multiplied by a first possible value of a sign of the interim signal; and determining a plurality of second feedback pre-scaled values, each being equivalent to a corresponding one of the plurality of feedback coefficients multiplied by a second possible value of the sign of the interim signal, wherein each of the plurality of selected feedback pre-scaled values is selected from one of the first feedback pre-scaled value and the second feedback pre-scaled value that correspond to a different one of the plurality of feedback coefficients.

The determining of the sign of the interim signal may be performed after determining the first and second feedback pre-scaled values. One of the plurality of feedback summed values may used as the feedback value.

The method may further comprise: determining a plurality of first feed-forward pre-scaled values, each being equivalent to a corresponding one of a plurality of feed-forward coefficients multiplied by a first possible value of a sign of the interim signal; determining a plurality of second feed-forward pre-scaled values, each being equivalent to a corresponding one of the plurality of feed-forward coefficients multiplied by a second possible value of the sign of the interim signal; generating a plurality of selected feed-forward pre-scaled values based on the sign of the interim signal; and passing the plurality of selected feed-forward pre-scaled values through a plurality of feed-forward delay elements and a plurality of feed-forward two-element summing elements to generate the feed-forward signal, wherein each of the plurality of selected feed-forward pre-scaled values is selected from one of the first feed-forward pre-scaled value and the second feed-forward pre-scaled value that correspond to a different one of the plurality of feed-forward coefficients.

One of the plurality of feed-forward summed values may be used as the feed-forward value. The determining of the sign of the interim signal may be performed after determining the first and second feed-forward pre-scaled values.

The operations of receiving, adding, determining a plurality of first feedback pre-scaled values, determining a plurality of second feedback pre-scaled values, determining, generating, passing, delaying, and adding may be successively repeated during an equalization process.

The sign bit may be a most significant bit of the interim signal. The method may be implemented in an integrated circuit.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. An equalizer, comprising:

a feedback combiner configured to combine an input signal and a single feedback signal to produce a first interim signal;

a delay line configured to delay the first interim signal to produce a second interim signal;

a feed-forward combiner configured to combine the second interim signal and a single feed-forward signal to produce an output signal;

an interim decision circuit configured to extract a value of a sign bit from the first interim signal, the sign bit having one of a first or a second value;

first through $N^{th}$ feedback elements, each configured to generate an $i^{th}$ feedback sum value based on: (1) the sign bit, (2) an $(i-1)^{th}$ feedback sum value, and (3) an $i^{th}$ feedback coefficient, wherein the $i^{th}$ feedback sum value is the $(i-1)^{th}$ feedback sum value minus the $i^{th}$ feedback coefficient when the sign bit has the first value, and wherein the first feedback sum value is the $(i-1)^{th}$ feedback sum value plus the $i^{th}$ feedback coefficient when the sign bit has the second value;

first through $M^{th}$ feed-forward elements, each configured to generate a $j^{th}$ feed-forward sum value based on: (1) the sign bit, (2) a $(j+1)^{th}$ feed-forward sum value, and (3) a $j^{th}$ feed-forward coefficient, wherein the $j^{th}$ feed-forward sum value is the $(j+1)^{th}$ feed-forward sum value minus the $j^{th}$ feed-forward coefficient when the sign bit has the first value, and wherein the $j^{th}$ feed-forward sum value is the $(j+1)^{th}$ feed-forward sum value plus the $j^{th}$ feed-forward coefficient when the sign bit has the second value;

wherein a $0^{th}$ feedback sum value is a first null value, wherein an $(M+1)^{th}$ feed-forward sum value is a second null value, wherein M is an integer greater than one, wherein N is an integer greater than one, wherein i is an index value that ranges from 1 to N, wherein j is an index value that ranges from 1 to M, wherein the single feedback signal is equal to the $N^{th}$ feedback sum value, and wherein the single feed-forward signal is equal to the first feed-forward sum value.

2. The equalizer of claim 1, wherein each of the first through $N^{th}$ feedback elements comprises:

a first feedback summing element configured to provide a first feedback pre-scaled value equivalent to an input signal minus a corresponding feedback coefficient;

a second feedback summing element configured to provide a second feedback pre-scaled value equivalent to the input signal minus a corresponding feedback coefficient; and a feedback selection element configured to receive both the first feedback pre-scaled value and the second feedback pre-scaled value, and to output one of the first feedback pre-scaled value and the second feedback pre-scaled value as a corresponding scaled feedback signal in response to the value of the sign bit.

3. The equalizer of claim 1, wherein each of the first through $M^{th}$ feed-forward scaling elements comprises:

a first feed-forward summing element configured to provide a first feed-forward pre-scaled value equivalent to an input signal minus a corresponding feed-forward coefficient;

a second feed-forward summing element configured to provide a second feedback pre-scaled value equivalent to the input signal minus a corresponding feed-forward coefficient; and a feed-forward selection element configured to receive both the first feed-forward pre-scaled value and the second feed-forward pre-scaled value, and to output one of the first feed-forward pre-scaled value and the second feed-forward pre-scaled value as a corresponding scaled feed-forward signal in response to the value of sign bit.

4. The equalizer of claim 1, wherein the sign bit is a most significant bit of the first interim signal.

5. The equalizer of claim 1, wherein the equalizer is implemented in an integrated circuit.

6. A method of performing signal equalization, comprising:

receiving an incoming signal;

adding a feedback signal to the incoming signal to generate an interim signal;

determining the sign of the interim signal as a sign bit;

generating a plurality of selected feedback pre-scaled values;

performing a plurality of respective summing operations on each of the plurality of respective selected feedback pre-scaled values and a plurality of respective immediately previous feedback sum values to generate a plurality of respective interim feedback sum values;

delaying each of the plurality of respective interim feedback sum values to generate a plurality of respective current feedback sum values;

selecting one of the plurality of current feedback sum values to generate the feedback signal;

delaying the interim signal to form a delayed signal; and adding a feed-forward signal to the delayed signal to generate an output signal.

7. The method of claim 6, wherein the determining of the sign of the interim signal is performed after determining first and second feedback pre-scaled values.

8. The method of claim 6, wherein one of the plurality of feedback summed values is used as the feedback signal.

9. The method of claim 6, further comprising:

generating a plurality of selected feed-forward pre-scaled values; and performing a plurality of respective summing operations on each of the plurality of respective selected feed-forward pre-scaled values and a plurality of respective immediately previous feed-forward sum values to generate a plurality of respective interim feed-forward sum values;

delaying each of the plurality of respective interim feed-forward sum values to generate a plurality of respective current feed-forward sum values;

selecting one of the current feed-forward sum values to generate the feed-forward signal.

10. The method of claim 9, wherein the determining of the sign of the interim signal is performed after generating first and second feed-forward pre-scaled values.

11. The method of claim 6, wherein the operations of receiving an incoming signal, adding a feedback signal to the incoming signal, determining the sign of the interim signal, generating a plurality of selected feedback pre-scaled values, performing a plurality of respective summing operations, delaying each of the plurality of respective interim feedback sum values, selecting one of the plurality of current feedback sum values, delaying the interim signal, and adding a feed-forward signal to the delayed signal are successively repeated during an equalization process.

12. The method of claim 6, wherein the sign bit is a most significant bit of the interim signal.

13. The method of claim 6, wherein the method is implemented in an integrated circuit.

14. An equalizer, comprising:
- a feedback combiner configured to combine an input signal and a single feedback signal to produce a first interim signal;
- a delay line configured to delay the first interim signal to produce a second interim signal;
- a feed-forward combiner configured to combine the second interim signal and a single feed-forward signal to produce an output signal;
- an interim decision circuit configured to extract a sign bit from the first interim signal;
- first through $N^{th}$ feedback scaling elements each configured to generate first through $N^{th}$ positive scaled feedback signals;
- first through $M^{th}$ feed-forward scaling elements each configured to generate first through $M^{th}$ positive scaled feed-forward signals;
- a feedback circuit configured to perform a plurality of respective summing operations on each of the first through $N^{th}$ positive scaled feedback signals and a plurality of respective immediately previous feedback sum values based on the sign bit, to generate a plurality of respective interim feedback sum values, to delay each of the plurality of respective interim feedback sum values to generate a plurality of respective current feedback sum values, and to provide one of the current feedback sum values as the feedback signal;
- a feed-forward circuit configured to perform a plurality of respective summing operations on each of the first through $M^{th}$ positive scaled feed-forward signals and a plurality of respective immediately previous feed-forward sum values based on the sign bit, to generate a plurality of respective interim feed-forward sum values, to delay each of the plurality of respective interim feed-forward sum values to generate a plurality of respective current feed-forward sum values, and to provide one of the current feed-forward sum values as the feed-forward signal;
- wherein M is an integer greater than one, and
- wherein N is an integer greater than one.

15. The equalizer of claim 14, wherein the feedback circuit comprises:
- first through $(N-1)^{th}$ positive feedback summing elements, each configured to add a corresponding one of the first through $(N-1)^{th}$ positive feedback scaled signals to a corresponding one of first through $(N-1)^{th}$ feedback input signals to generate a corresponding one of first through $(N-1)^{th}$ added feedback summed signals;
- first through $(N-1)^{th}$ negative feedback summing elements, each configured to subtract a corresponding one of the first through $(N-1)^{th}$ positive feedback scaled signals to from a corresponding one of the first through $(N-1)^{th}$ feedback input signals to generate a corresponding one of first through $(N-1)^{th}$ subtracted feedback summed signals;
- first through $(N-1)^{th}$ selection elements each configured to select a corresponding one of the first through $(N-1)^{th}$ added feedback summed signals and the first through $N^{th}$ subtracted feedback summed signals as a corresponding one of first through $N^{th}$ selected feedback summed signals;
- an $N^{th}$ selection element configured to select one of the $N^{th}$ positive feedback scaled signal and an inverse of the $N^{th}$ positive feedback scaled signal as an $N^{th}$ selected feedback summed signal;
- first through $N^{th}$ delay elements configured to delay the first through $N^{th}$ selected feedback summed signals, respectively, to generate first through $N^{th}$ feedback output signals,
- wherein each of the first through $(N-1)^{th}$ feedback input values is equal to a corresponding previous one of the second through $N^{th}$ feedback output signals, and
- wherein the first feedback output signal is provided as the single feedback signal.

16. The equalizer of claim 14, wherein the feed-forward circuit comprises:
- first through $(M-1)^{th}$ positive feed-forward summing elements, each configured to add a corresponding one of the first through $(M-1)^{th}$ positive feed-forward scaled signals to a corresponding one of first through $(M-1)^{th}$ feed-forward input signals to generate a corresponding one of first through $(M-1)^{th}$ added feed-forward summed signals;
- first through $(M-1)^{th}$ negative feed-forward summing elements, each configured to subtract a corresponding one of the first through $(M-1)^{th}$ positive feed-forward scaled signals to from a corresponding one of the first through $(M-1)^{th}$ feed-forward input signals to generate a corresponding one of first through $(M-1)^{th}$ subtracted feed-forward summed signals;
- first through $(M-1)^{th}$ selection elements each configured to select a corresponding one of the first through $(M-1)^{th}$ added feed-forward summed signals and the first through $M^{th}$ subtracted feed-forward summed signals as a corresponding one of first through $M^{th}$ selected feed-forward summed signals;
- an $M^{th}$ selection element configured to select one of the $M^{th}$ positive feed-forward scaled signal and an inverse of the $M^{th}$ positive feed-forward scaled signal as an $M^{th}$ selected feed-forward summed signal;
- first through $M^{th}$ delay elements configured to delay the first through $M^{th}$ selected feed-forward summed signals, respectively, to generate first through $M^{th}$ feed-forward output signals,
- wherein each of the first through $(M-1)^{th}$ feed-forward input values is equal to a corresponding previous one of the second through $M^{th}$ feed-forward output signals, and
- wherein the first feed-forward output signal is provided as the single feed-forward signal.

* * * * *